(12) United States Patent
Kashiwagi

(10) Patent No.: US 10,014,648 B2
(45) Date of Patent: Jul. 3, 2018

(54) BRIDGE FIBER, COMBINER, AND FIBER LASER DEVICE

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 386 days.

(21) Appl. No.: 14/740,590

(22) Filed: Jun. 16, 2015

(65) Prior Publication Data

US 2015/0280389 A1 Oct. 1, 2015

Related U.S. Application Data

(62) Division of application No. 14/133,867, filed on Dec. 19, 2013, now Pat. No. 9,088,129.

(30) Foreign Application Priority Data

Dec. 21, 2012 (JP) .................. 2012-279218

(51) Int. Cl.
| | |
|---|---|
| *H01S 3/067* | (2006.01) |
| *G02B 6/036* | (2006.01) |
| *G02B 6/28* | (2006.01) |
| *H01S 3/094* | (2006.01) |

(52) U.S. Cl.
CPC ...... *H01S 3/06783* (2013.01); *G02B 6/03611* (2013.01); *G02B 6/03638* (2013.01); *G02B 6/2821* (2013.01); *G02B 6/2852* (2013.01); *H01S 3/0675* (2013.01); *H01S 3/06745* (2013.01); *H01S 3/06791* (2013.01);
(Continued)

(58) Field of Classification Search
CPC ............ H01S 3/06754; H01S 3/06783; G02B 6/03611; G02B 6/03638; G02B 6/2821; G02B 6/2852
See application file for complete search history.

(56) References Cited

U.S. PATENT DOCUMENTS

| | | | |
|---|---|---|---|
| 6,434,302 B1 * | 8/2002 | Fidric ................. | G02B 6/2856 385/43 |
| 6,535,678 B1 * | 3/2003 | Yamauchi .......... | G02B 6/02019 385/123 |

(Continued)

FOREIGN PATENT DOCUMENTS

| | | |
|---|---|---|
| JP | 5-82914 A | 4/1993 |
| JP | 2007-72418 A | 3/2007 |

(Continued)

*Primary Examiner* — Eric L Bolda
(74) *Attorney, Agent, or Firm* — Westerman, Hattori, Daniels & Adrian, LLP

(57) ABSTRACT

A bridge fiber includes a core layer and an outer layer which has an index of refraction higher than that of the core layer and covers the outer peripheral surface of the core layer. The outer layer is surrounded by a substance such as the atmosphere having an index of refraction lower than an index of refraction $n_2$ of the outer layer. An area AR1 of the outer layer at one end face of the bridge fiber is an area that is to be optically coupled to an end face of a core of each of a plurality of pumping light inputting optical fibers, while an area AR2 of the core layer at another end face of the bridge fiber is an area that is to be optically coupled to an end face of a core of an amplification optical fiber.

12 Claims, 6 Drawing Sheets

(52) U.S. Cl.
CPC .. *H01S 3/094007* (2013.01); *H01S 3/094053* (2013.01); *H01S 3/09408* (2013.01)

(56) References Cited

U.S. PATENT DOCUMENTS

| | | | |
|---|---|---|---|
| 7,016,573 B2* | 3/2006 | Dong | G02B 6/2551 |
| | | | 385/46 |
| 7,272,956 B1 | 9/2007 | Anikitchev et al. | |
| 7,492,993 B2 | 2/2009 | Nakai et al. | |
| 7,822,080 B2 | 10/2010 | Jiang | |
| 7,840,107 B2 | 11/2010 | Tanigawa et al. | |
| 8,462,429 B2 | 6/2013 | Tanaka | |
| 8,693,088 B2 | 4/2014 | Fini et al. | |
| 2006/0120677 A1* | 6/2006 | Broeng | G02B 6/02338 |
| | | | 385/125 |
| 2008/0050069 A1* | 2/2008 | Skovgaard | G02B 6/02376 |
| | | | 385/39 |
| 2008/0159702 A1 | 7/2008 | Skovgaard et al. | |
| 2009/0067795 A1 | 3/2009 | DiGiovanni et al. | |
| 2009/0092365 A1 | 4/2009 | Donlagic | |
| 2010/0278486 A1 | 11/2010 | Holland et al. | |
| 2012/0251059 A1 | 10/2012 | Broeng et al. | |
| 2013/0243377 A1 | 9/2013 | Seo et al. | |
| 2015/0277033 A1* | 10/2015 | Li | C03B 37/01288 |
| | | | 385/125 |

FOREIGN PATENT DOCUMENTS

| | | |
|---|---|---|
| JP | 2012-129426 A | 7/2012 |
| JP | 2012-212775 A | 11/2012 |
| JP | 2012-238781 A | 12/2012 |
| WO | 2006/089999 A1 | 8/2006 |
| WO | 2010/067510 A1 | 6/2010 |

* cited by examiner

BRIDGE FIBER, COMBINER, AND FIBER LASER DEVICE

This application is a divisional of U.S. application Ser. No. 14/133,867, filed on Dec. 19, 2013, which claims priority to Japanese priority application No. 2012-279218 filed on Dec. 21, 2012, which are hereby incorporated by reference.

BACKGROUND OF THE INVENTION

Field of the Invention

The present invention relates to a bridge fiber, a combiner, and a fiber laser device that are suited for reducing light returning to a pumping light source from an amplification optical fiber.

Description of Related Art

There has been implemented a fiber laser device in which pumping light emitted from a pumping light source enters an amplification optical fiber through a combiner. In some cases, the fiber laser device of this kind experiences failure of the pumping light source when the light amplified by the amplification optical fiber returns to the combiner as return light and is propagated to the pumping light source through the combiner.

Patent Literature 1 has been disclosed as a measure to remove such return light. In Patent Literature 1, an anti-reflective film is attached at an entrance end of the amplification optical fiber in order to guide the light to the outside, the light being generated within the amplification optical fiber and having a specific wavelength.

CITATION LIST

Patent Literature

Patent Literature 1: JP-A-5-82914

SUMMARY OF THE INVENTION

It is however difficult in the method described in Patent Literature 1 to remove the return light having a wavelength other than the specific wavelength, whereby the return light may cause failure in the pumping light source in some cases. Moreover, in the method described in Patent Literature 1, the anti-reflective film is interposed between a bridge fiber included in a combiner and the amplification optical fiber, thereby creating a space between the bridge fiber and the amplification optical fiber, which tends to complicate the alignment of an optical axis.

Accordingly, an object of the present invention is to provide a bridge fiber, a combiner, and a fiber laser device that can easily reduce failure of a pumping light source caused by return light.

In order to achieve such object, according to a first aspect of the present invention, there is provided a bridge fiber including: a core layer; and an outer layer which has an index of refraction higher than an index of refraction of the core layer and covers an outer peripheral surface of the core layer, wherein the outer layer is surrounded by a substance having an index of refraction lower than the index of refraction of the outer layer, an area of the outer layer at one end face of the bridge fiber is an area that is to be optically coupled to an end face of a core of each of a plurality of pumping light inputting optical fibers, and an area of the core layer at another end face of the bridge fiber is an area that is to be optically coupled to an end face of a core of an amplification optical fiber.

Further, according to a second aspect of the present invention, there is provided a combiner including: a plurality of pumping light inputting optical fibers; and a bridge fiber including: a core layer; and an outer layer which has an index of refraction higher than an index of refraction of the core layer and covers an outer peripheral surface of the core layer, wherein the outer layer is surrounded by a substance having an index of refraction lower than the index of refraction of the outer layer, an area of the outer layer at one end face of the bridge fiber is optically coupled to an end face of each of the plurality of pumping light inputting optical fibers, and an area of the core layer at another end face of the bridge fiber is an area that is to be optically coupled to an end face of a core of an amplification optical fiber.

Further, according to a third aspect of the present invention, there is provided a fiber laser device including: a plurality of pumping light inputting optical fibers; an amplification optical fiber; a bridge fiber including: a core layer; and an outer layer which has an index of refraction higher than an index of refraction of the core layer and covers an outer peripheral surface of the core layer; and a pair of mirrors which is disposed at a predetermined distance from each other in the amplification optical fiber, wherein the outer layer is surrounded by a substance having an index of refraction lower than the index of refraction of the outer layer, an area of the outer layer at one end face of the bridge fiber is optically coupled to an end face of each of the plurality of pumping light inputting optical fibers, and an area of the core layer at another end face of the bridge fiber is optically coupled to an end face of a core of the amplification optical fiber.

The aforementioned configuration can decrease the number of modes having high intensity in the outer layer among propagation modes of light in the bridge fiber. Therefore, the return light entering the bridge fiber from the amplification optical fiber is coupled more to a mode having high intensity in the core layer, so that the return light entering the bridge fiber from the amplification optical fiber can be mostly trapped in the core layer.

As a result, the propagation of the return light to the pumping light source through the pumping light inputting optical fiber can be suppressed without using a special member such as a reflective film.

Accordingly, there is implemented the bridge fiber, the combiner, and the fiber laser device that can reduce the failure of the pumping light source caused by the return light.

It is preferred that the substance be the atmosphere. There is no propagation mode of light passing outside the outer layer where the atmosphere surrounds the outer layer, so that the return light entering the bridge fiber from the amplification optical fiber is coupled more to a mode having high intensity in the core layer. The return light entering the bridge fiber from the amplification optical fiber can be further trapped in the core layer as a result.

It is also preferred that the substance be an outermost layer covering the outer peripheral surface of the outer layer.

When the outermost layer covers the outer layer, the impact on the outer layer from outside can be reduced while much of the return light is coupled to a mode having high intensity in the core layer, thereby retaining the function of trapping the return light and at the same time increasing the resistance of the bridge fiber.

Moreover, it is preferred that the index of refraction is lower in the outermost layer than in the core layer.

In a case where the outer layer is covered by the outermost layer having the index of refraction lower than that of the core layer and the outer layer, the effective index of refraction is lower in a mode having high intensity in the outermost layer than in a mode having high intensity in the core layer among the propagation modes of light in the bridge fiber. This means that, among the light being propagated in the core layer, the light coupled to the mode having high intensity in the core layer is not readily coupled to the mode having high intensity in the outer layer. As a result, the return light entering the bridge fiber from the amplification optical fiber can be further trapped in the core layer where the outer layer is covered by the outermost layer.

Furthermore, it is preferred that the outer diameter of the core layer at the other end face of the bridge fiber be larger than the outer diameter of a core of an optical fiber that is fused to the core layer.

In this case, the return light from the amplification optical fiber can be trapped in the core layer without leaving any portion of it behind, whereby the failure of the pumping light source caused by the return light can be further reduced as compared to when the outer diameter of the core layer is smaller than or equal to the outer diameter of the core of the amplification optical fiber.

It is further preferred that the bridge fiber includes a tapered portion, the diameter of which decreases from the side corresponding to the one end face of the bridge fiber toward the side corresponding to the other end face of the bridge fiber.

In this case, the bridge fiber can collect the pumping light and guide it to the amplification optical fiber so that the amplification efficiency can be improved, the pumping light being input from the plurality of pumping light inputting optical fibers through the end face of the untapered side of the bridge fiber.

According to the present invention, there can be provided the bridge fiber, the combiner, and the fiber laser device that can easily reduce the failure of the pumping light source caused by the return light.

DETAILED DESCRIPTION OF THE INVENTION

Embodiments of the present invention will now be described in detail with reference to the drawings.

(1) First Embodiment

Configuration of Fiber Laser Device

Figure 1:
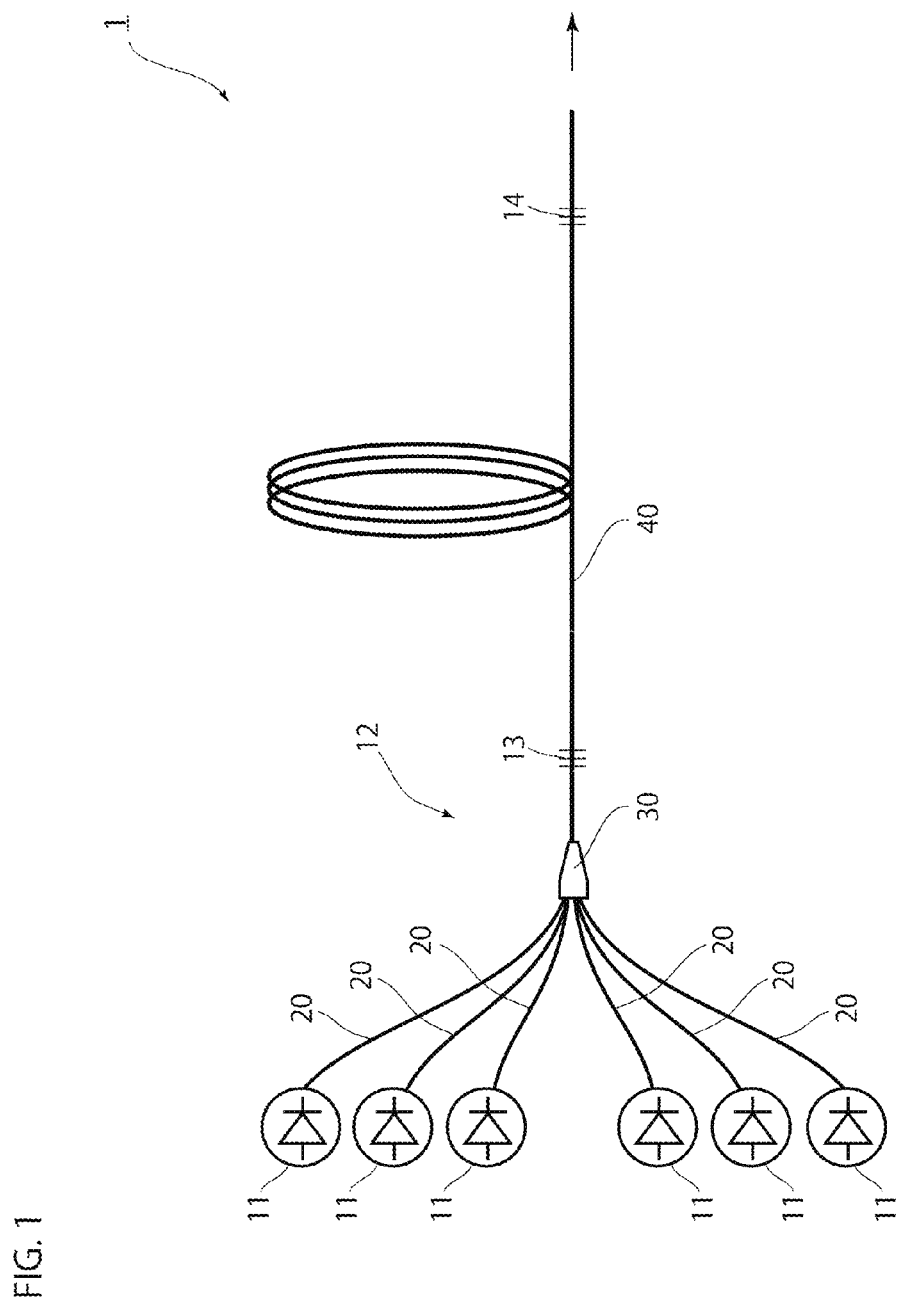
FIG. 1 is a diagram illustrating a fiber laser device according to a first embodiment.

FIG. 1 is a diagram illustrating a fiber laser device 1 according to a first embodiment. As illustrated in FIG. 1, the fiber laser device 1 according to the embodiment is a resonant fiber laser that includes, as a main component, a plurality of pumping light sources 11, a combiner 12, a first FBG (Fiber Bragg Grating) 13 serving as a first mirror, and a second FBG 14 serving as a second mirror.

The plurality of pumping light sources 11 emits pumping light and is formed of a laser diode, for example.

Figure 2:
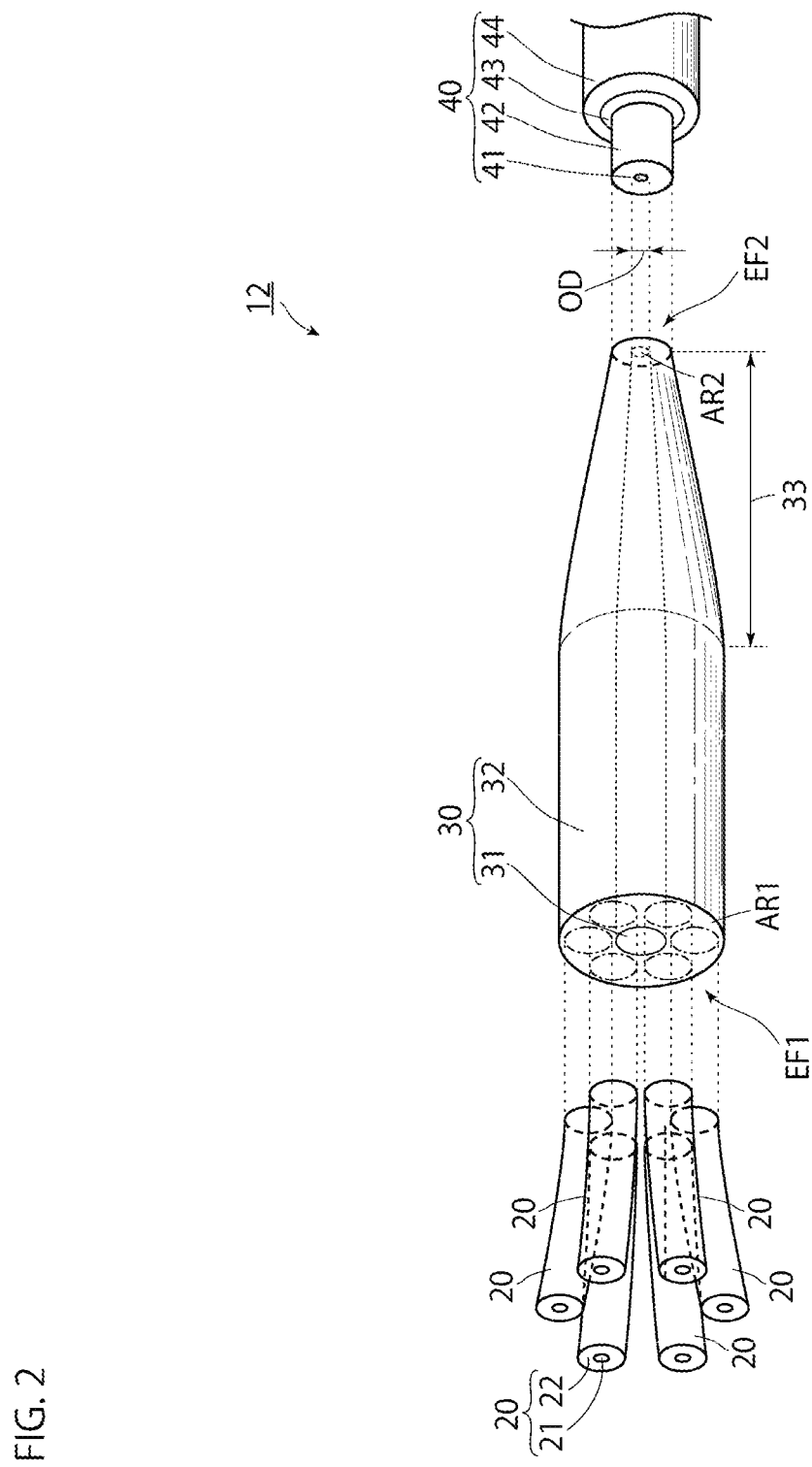
FIG. 2 is a diagram illustrating a combiner.

FIG. 2 is a diagram illustrating the combiner 12. As illustrated in FIGS. 1 and 2, the combiner 12 includes as a main component a plurality of pumping light inputting optical fibers 20, a bridge fiber 30, and an amplification optical fiber 40.

The plurality of pumping light inputting optical fibers 20 is an optical fiber which inputs the pumping light emitted from the pumping light source 11 into the bridge fiber 30, where the number of the pumping light inputting optical fibers provided is the same as the number of the pumping light sources 11 provided. Each of the pumping light inputting optical fibers 20 including a core 21 and cladding 22 that covers the core 21 is a multi-mode fiber, for example.

The index of refraction of the core 21 is higher than that of the cladding 22. Note that the core 21 is formed of a material such as quartz, while the cladding 22 is formed of a material such as quartz doped with fluorine or the like.

The bridge fiber 30 is an optical fiber which optically couples the plurality of pumping light inputting optical fibers 20 and the amplification optical fiber 40 and includes, as a main component, a core layer 31 and an outer layer 32 that covers an outer peripheral surface of the core layer 31 without any gaps.

The core layer 31 and the outer layer 32 includes a tapered portion 33, the diameter of which decreases from the side corresponding to one end face of the bridge fiber 30 facing an end face of the pumping light inputting optical fiber 20 toward the side corresponding to another end face of the bridge fiber 30 facing an end face of the amplification optical fiber 40. The one end face of the bridge fiber 30 is an untapered end face (hereinafter referred to as a large-diameter end face) EF1, whereas the other end face of the bridge fiber 30 is a tapered end face (hereinafter referred to as a small-diameter end face) EF2.

An area AR1 of the outer layer 32 at the large-diameter end face EF1 is an area to be optically coupled to an end face of a core of each of the plurality of pumping light inputting optical fibers 20. In the embodiment, the end face of the core of each of the plurality of pumping light inputting optical fibers 20 is fused to the area AR1 of the outer layer 32 such that the end faces of the cores are equally spaced.

On the other hand, an area AR2 of the core layer 31 at the small-diameter end face EF2 is an area to be optically coupled to an end face of a core of the amplification optical fiber 40. The end face of the core of the amplification optical fiber 40 is fused to the area AR2 of the core layer 31 in the embodiment.

Figure 3A:
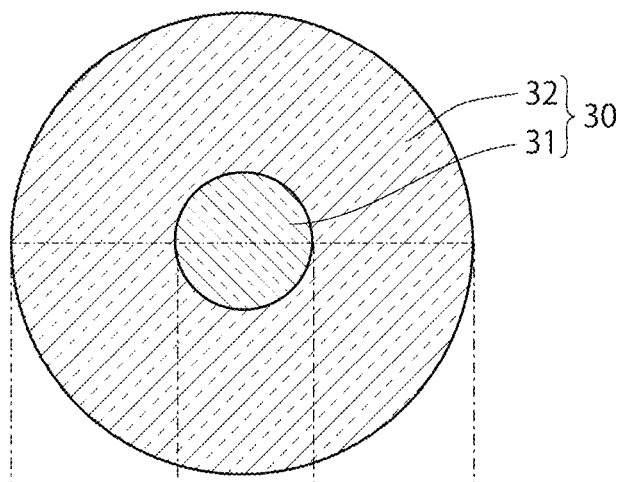
FIGS. 3A and 3B are diagrams illustrating a state of a bridge fiber cut orthogonally to a longitudinal direction of the bridge fiber.
Figure 3B:
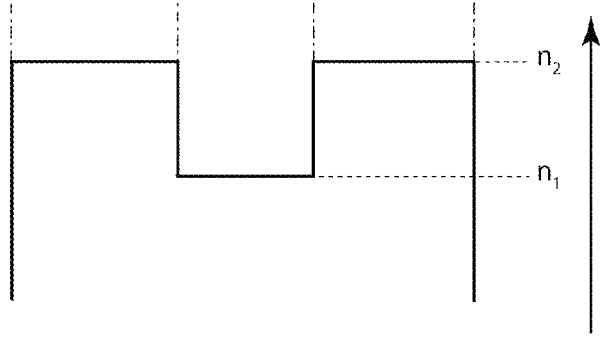

FIGS. 3A and 3B are diagrams illustrating a state of the bridge fiber cut orthogonally to a longitudinal direction of the bridge fiber 30. As illustrated in FIGS. 3A and 3B, an index of refraction $n_1$ of the core layer 31 is lower than an index of refraction $n_2$ of the outer layer 32. The outer layer 32 is encircled by the atmosphere having the index of refraction lower than the index of refraction $n_2$ of the outer layer 32. That is, the outer peripheral surface of the outer layer 32 is encircled by air cladding.

The core layer 31 is formed of a material such as quartz doped with fluorine (F) or the like which decreases the index of refraction, while the outer layer 32 is formed of a material such as pure quartz.

The amplification optical fiber 40 as illustrated in FIG. 2 includes a core 41 to which one kind or two or more kinds of active elements are added, first cladding 42 which covers the outer peripheral surface of the core 41, second cladding 43 which covers the outer peripheral surface of the first cladding 42, and a coating layer 44 surrounding the second cladding.

The active element here includes a rare earth element such as erbium (Er), ytterbium (Yb) or neodymium (Nd), or bismuth (Bi) that is not the rare earth element, for example.

The index of refraction is higher in the core 41 than in the first cladding 42, higher in the first cladding 42 than in the second cladding 43, and lower in the second cladding 43 than in the coating layer 44. In terms of suppressing the refraction of light entering from the bridge fiber 30, it is preferred that the index of refraction in the first cladding 42 be equal to that in the outer layer 32 of the bridge fiber 30.

The outer diameter of the core 41 is smaller than or equal to an outer diameter OD of the core layer 31 of the bridge fiber 30 where, as described above, the area AR2 of the core layer 31 at the small-diameter end face EF2 of the bridge fiber 30 is fused to the end face of the core 41. Note that the coating layer 44 near the end face of the core of the amplification optical fiber 40 is peeled off while the end face of the core is fused to the bridge fiber 30.

The first FBG 13 is provided in a region of the amplification optical fiber 40 closer to the bridge fiber 30 than the second FBG 14 and has a structure where a part with high index of refraction is repeated in a fixed cycle along the longitudinal direction of the amplification optical fiber 40. This part is adjusted to reflect at least a part of the wavelength of light emitted by the pumped active element in the amplification optical fiber 40.

The second FBG 14 is provided in a region of the amplification optical fiber 40 farther from the bridge fiber 30 than the first FBG 13 and has a structure where a part with high index of refraction is repeated in a fixed cycle along the longitudinal direction of the amplification optical fiber 40. This part is adjusted to reflect light having the same wavelength as that of the light reflected by the first FBG 13 at a reflectance lower than that of the first FBG 13.

Operation and Effect

In the fiber laser device 1 according to the embodiment, the pumping light entering the bridge fiber 30 from the pumping light source 11 through the pumping light inputting optical fiber 20 is propagated in the outer layer 32 of the bridge fiber 30 and then enters the cladding 42 of the amplification optical fiber 40.

The pumping light having entered the cladding 42 is propagated in the cladding 42 and the core 41 of the amplification optical fiber 40 and pumps the active element added to the core 41, whereby the active element emits spontaneous emission light having a specific wavelength.

The spontaneous emission light is amplified while being propagated in the core 41 of the amplification optical fiber 40 back and forth between the first FBG 13 and the second FBG 14, so that a part of the light amplified transmits through the second FBG 14 and is emitted from an output end of the amplification optical fiber 40.

Now, there is a case where a part of the light amplified between the first FBG 13 and the second FBG 14 transmits through the first FBG 13 and returns to the bridge fiber 30.

In this case, among the propagation modes of light in the bridge fiber 30, the number of modes having high intensity in the outer layer 32 can be decreased because the outer layer 32 is encircled by the atmosphere having the index of refraction $n_2$ of the outer layer 32 higher than the index of refraction $n_1$ of the core layer 31 and lower than the index of refraction $n_2$ of the outer layer 32 in the bridge fiber 30 of the embodiment.

As a result, the return light entering the bridge fiber 30 from the amplification optical fiber 40 is coupled more to the mode having high intensity in the core layer 31. Therefore, the return light entering the bridge fiber 30 from the amplification optical fiber 40 can be mostly trapped in the core layer 31.

Figure 4:
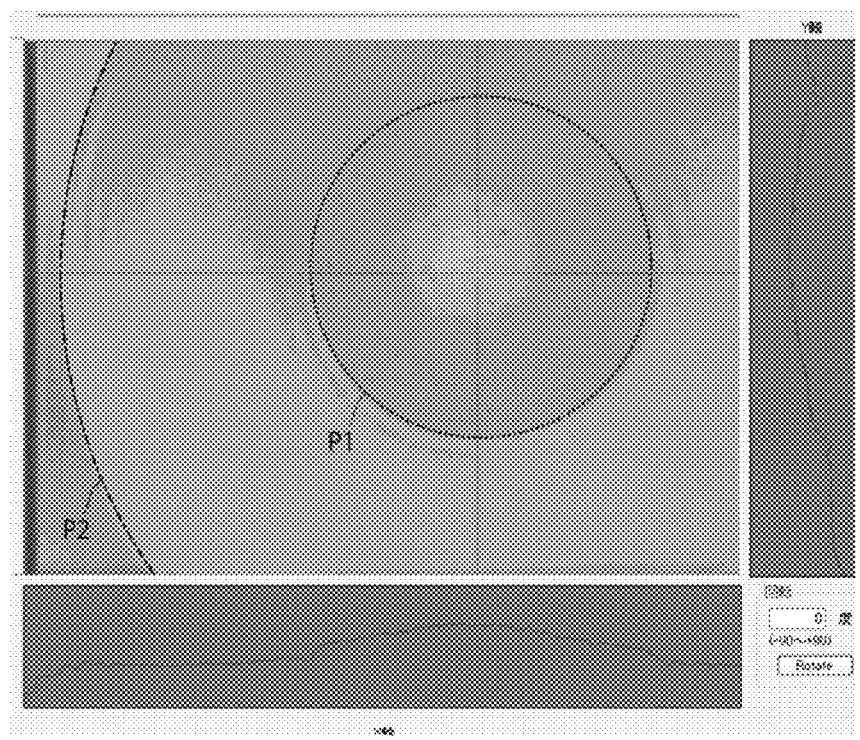
FIG. 4 is a diagram illustrating the result of monitoring the intensity distribution of return light that returns to the bridge fiber.

FIG. 4 illustrates the result of monitoring the intensity distribution of the return light returning to the bridge fiber 30. Here, it is assumed that the diameter of the core layer 31 at the small-diameter end face EF2 of the bridge fiber 30 is 30 μm, the diameter of the outer layer 32 is 125 μm, and the diameter reduction rate of the small-diameter end face EF2 with respect to the large-diameter end face EF1 is 33%. The index of refraction $n_2$ of the outer layer 32 is set 0.8% higher than the index of refraction $n_1$ of the core layer 31.

Moreover, it is assumed that the diameter of the core 41 in the amplification optical fiber 40 is 6 μm, the diameter of the first cladding 42 is 125 μm, and the diameter of the second cladding 43 is 250 μm where the index of refraction of the core 41 is set 0.15% higher than that of the first cladding 42 and 5% higher than that of the second cladding 43.

It is further assumed that the active element added to the core 41 of the amplification optical fiber 40 is ytterbium, an LD light source with the wavelength of 915 nm is employed as the pumping light source 11, and the reflective wavelength of the first FBG 13 is 1064 nm.

A dotted line P1 corresponds to the outer periphery of the core layer 31, and a dot-dashed line P2 corresponds to the outer periphery of the outer layer 32 as illustrated in FIG. 4, where the intensity of the return light is the highest in the core layer 31 according to the intensity distribution of the return light. In other words, the return light returning to the bridge fiber 30 is collected in the core layer 31 of the bridge fiber 30, the core layer 31 having a function of trapping the return light. Note that an intersection between a vertical line and a horizontal line in FIG. 4 corresponds to an entrance point of the return light.

Accordingly, the propagation of the return light to the pumping light source 11 through the pumping light inputting optical fiber 20 can be suppressed without using a special member such as a reflective film, when the return light enters the bridge fiber 30 of the embodiment from the amplification optical fiber 40.

The embodiment can therefore realize the bridge fiber 30, the combiner 12, and the fiber laser device 1 that can easily reduce the failure of the pumping light source 11 caused by the return light.

Note that the pumping light is mainly propagated in the area of the outer layer when the index of refraction $n_1$ of the core layer 31 is lower than the index of refraction $n_2$ of the outer layer 32. Therefore, there can be suppressed the increase in the amount of pumping light absorbed by the element added to the core 41 of the amplification optical fiber 40 in the vicinity of the input end of the amplification optical fiber 40. As a result, the amplification efficiency can be improved by propagating the pumping light farther in the amplification optical fiber 40, thereby also inhibiting the end portion of the amplification optical fiber 40 from generating significantly more heat than another portion.

The outer layer 32 of the embodiment is surrounded by the atmosphere. In this case, there is no propagation mode of light passing outside the outer layer 32, whereby the return light entering the bridge fiber 30 from the amplification optical fiber 40 is coupled more to the mode having high intensity in the core layer 31. The return light entering the bridge fiber 30 from the amplification optical fiber 40 can be further trapped in the core layer 31 as a result.

Also in the embodiment, the outer diameter OD of the core layer 31 at the small-diameter end face EF2 of the bridge fiber 30 is larger than the outer diameter of the core of the amplification optical fiber 40 fused to the core layer. The return light from the amplification optical fiber 40 can thus be trapped in the core layer 31 without leaving any portion of it behind, whereby the failure of the pumping light source 11 caused by the return light can be further reduced as compared to when the outer diameter of the core layer 31 is smaller than or equal to the outer diameter of the core of the amplification optical fiber 40.

Also in the embodiment, the core layer 31 and the outer layer 32 of the bridge fiber 30 includes the tapered portion 33, the diameter of which decreases from the side corresponding to the large-diameter end face toward the side corresponding to the small-diameter end face. As a result, the bridge fiber 30 can collect the pumping light and guide it to the amplification optical fiber 40 fused to the small-diameter end face EF2 on the tapered side so that the amplification efficiency can be improved, the pumping light being input from the plurality of pumping light inputting optical fibers 20 fused to the large-diameter end face EF1 on the untapered side.

(2) Second Embodiment

Now, a second embodiment suited for the present invention will be described in detail with reference to the drawings. Note that the redundant description of a component identical or equivalent to that in the first embodiment will be omitted by assigning the same reference numeral to the component unless described otherwise.

Figure 5:
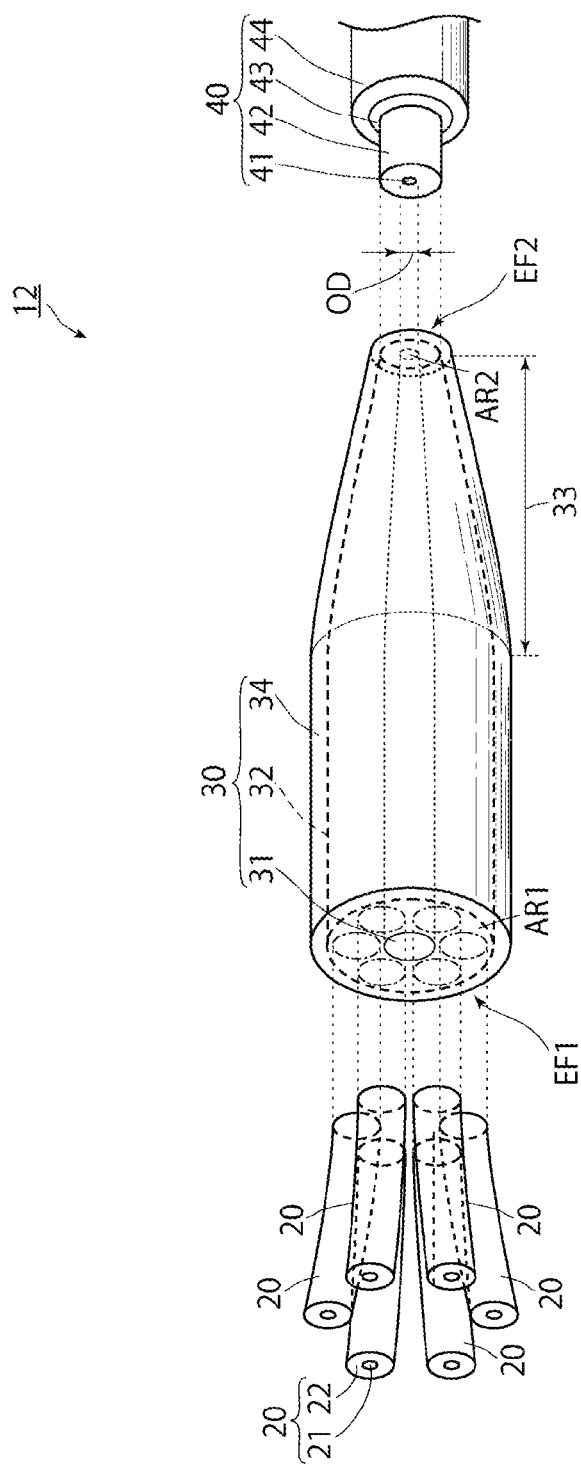
FIG. 5 is a diagram illustrating a combiner according to a second embodiment.

FIG. 5 is a diagram illustrating a combiner 12 according to the second embodiment. As illustrated in FIG. 5, the combiner 12 in the embodiment differs from the combiner 12 of the first embodiment in that an outermost layer 34 covering the outer peripheral surface of an outer layer 32 is further included in the combiner of the embodiment.

Figure 6A:
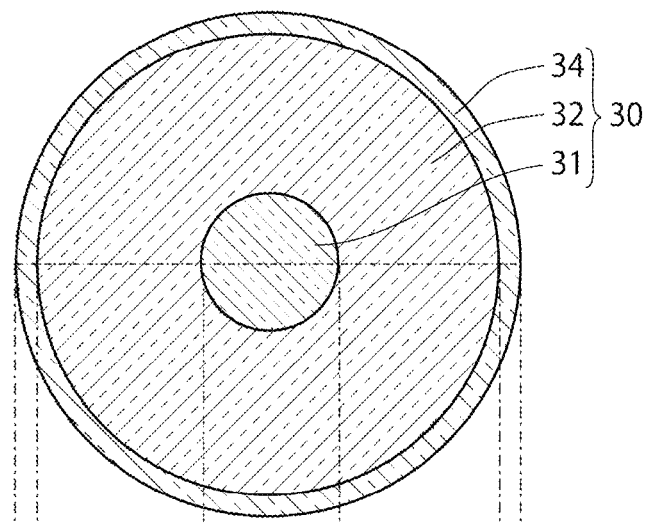
FIGS. 6A and 6B are diagrams illustrating a state of a bridge fiber according to the second embodiment.
Figure 6B:
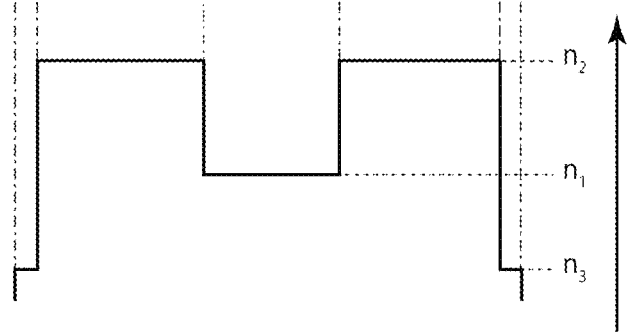

FIGS. 6A and 6B are diagrams illustrating a state of a bridge fiber according to the second embodiment. As illustrated in FIGS. 6A and 6B, an index of refraction $n_3$ of the outermost layer 34 is lower than the indices of refraction $n_1$ and $n_2$ of a core layer 31 and the outer layer 32, respectively. The outermost layer 34 is formed of a material such as resin having an index of refraction lower than the indices of refraction $n_1$ and $n_2$ of the core layer 31 and the outer layer 32, or quartz to which fluorine is added.

In a case where the outer layer 32 is covered by the outermost layer 34 with the index of refraction $n_3$ lower than the indices of refraction $n_1$ and $n_2$ of the core layer 31 and the outer layer 32, the effective index of refraction is lower in a mode having high intensity in the outermost layer 34 than in a mode having high intensity in the core layer 31 among propagation modes of light in a bridge fiber 30.

This means that, among the light being propagated in the core layer 31, the light coupled to the mode having high intensity in the core layer 31 is not readily coupled to the mode having high intensity in the outer layer 32. Return light entering the bridge fiber 30 from an amplification optical fiber 40 can be trapped in the core layer 31 as a result.

Moreover, the outermost layer 34 being physically provided outside the outer layer 32 can reduce the impact on the outer layer 32 from outside as compared to the first embodiment.

While the first and second embodiments have been described as an example, the present invention is not limited to the aforementioned embodiments.

For example, the small-diameter end face EF2 of the bridge fiber 30 is directly fused to the one end face of the amplification optical fiber 40 in the first and second embodiments. However, a relaying optical fiber may be interposed between the bridge fiber 30 and the amplification optical fiber 40 as long as the bridge fiber 30 is optically coupled to the amplification optical fiber 40.

In such case where the relaying optical fiber is interposed, one end face of the relaying optical fiber is fused to the small-diameter end face EF2 of the bridge fiber 30, and another end face of the relaying optical fiber is fused to one end face of the amplification optical fiber 40. A double-cladding fiber can be applied as the relaying optical fiber where a rare earth element is not added to a core of the fiber. Similar to the first and second embodiments, it is preferred that the outer diameter of the core layer 31 of the bridge fiber 30 be larger than the outer diameter of the core of the relaying optical fiber.

Moreover, the tapered portion 33 provided to the bridge fiber 30 in the first and second embodiments may be omitted.

While six of the pumping light inputting optical fibers 20 are provided as an example in the first and second embodiments, the number of pumping light inputting optical fibers may be anywhere between two to five pieces or seven or more pieces. In short, various numbers of the pumping light inputting optical fibers can be applied as long as two or more of them are provided. Note that, in terms of homogenizing the optical property caused by the arrangement of the pumping light inputting optical fibers 20, it is preferred to apply the number of pumping light inputting optical fibers such that the fibers can be arranged symmetrically about the central axis of the core layer 31 in the bridge fiber 30.

While the outer diameter OD of the core layer 31 at the small-diameter end face EF2 of the bridge fiber 30 is larger than the outer diameter of the core of the amplification optical fiber 40 fused to the core layer 31 in the first and second embodiments, the outer diameter OD may be smaller than or equal to the outer diameter of the core.

Furthermore, the index of refraction $n_3$ of the outermost layer 34 in the second embodiment is lower than the indices of refraction $n_1$ and $n_2$ of the core layer 31 and the outer layer 32. The index of refraction $n_3$ of the outermost layer 34 may however be higher than the index of refraction $n_1$ of the core layer 31 as long as the index of refraction $n_3$ is lower than the index of refraction $n_2$ of the outer layer 32.

Note that in addition to what is illustrated in the first and second embodiments or another embodiment, each component of the bridge fiber 30, the combiner 12, and the fiber laser device 1 described above can be combined, omitted, modified, or subjected to addition of a known technique as appropriate without departing from the object of the present application.

What is claimed is:

1. A bridge fiber comprising:
a core layer; and
an outer layer which has an index of refraction higher than an index of refraction of the core layer and covers an outer peripheral surface of the core layer, wherein
the outer layer is covered with a layer having an index of refraction lower than the index of refraction of the outer layer,
an area of the outer layer at one end face of the bridge fiber is an area that is to be optically coupled to an end face of a core of each of a plurality of pumping light inputting optical fibers,
an area of the core layer at another end face of the bridge fiber is an area that is to be optically coupled to an end face of a core of an amplification optical fiber, and
the layer does not have a hole, wherein an index of refraction of the layer is lower than the index of refraction of the core layer.

2. The bridge fiber according to claim 1, wherein an outer diameter of the core layer at the other end face of the bridge fiber is larger than an outer diameter of a core of an optical fiber fused to the core layer.

3. The bridge fiber according to claim 1, further comprising a tapered portion, a diameter of which decreases from a side corresponding to the one end face of the bridge fiber toward a side corresponding to the other end face of the bridge fiber.

4. A combiner comprising:
a plurality of pumping light inputting optical fibers; and
a bridge fiber including:
a core layer; and
an outer layer which has an index of refraction higher than an index of refraction of the core layer and covers an outer peripheral surface of the core layer, wherein
the outer layer is covered with a layer having an index of refraction lower than the index of refraction of the outer layer,
an area of the outer layer at one end face of the bridge fiber is optically coupled to an end face of each of the plurality of pumping light inputting optical fibers,
an area of the core layer at another end face of the bridge fiber is an area that is to be optically coupled to an end face of a core of an amplification optical fiber,
the layer does not have a hole, and
wherein an index of refraction of the layer is lower than the index of refraction of the core layer.

5. A fiber laser device comprising:
a plurality of pumping light inputting optical fibers;
an amplification optical fiber;
a bridge fiber including:
a core layer; and
an outer layer which has an index of refraction higher than an index of refraction of the core layer and covers an outer peripheral surface of the core layer; and a pair of mirrors which is disposed at a predetermined distance from each other in the amplification optical fiber, wherein
the outer layer is covered with a layer having an index of refraction lower than the index of refraction of the outer layer,
an area of the outer layer at one end face of the bridge fiber is optically coupled to an end face of each of the plurality of pumping light inputting optical fibers,
an area of the core layer at another end face of the bridge fiber is optically coupled to an end face of a core of the amplification optical fiber,
the layer does not have a hole, and
wherein an index of refraction of the layer is lower than the index of refraction of the core layer.

6. The bridge fiber according to claim 1, wherein an outer diameter of the core layer at the other end face of the bridge fiber is larger than an outer diameter of a core of an optical fiber fused to the core layer.

7. The bridge fiber according to claim 1, further comprising a tapered portion, a diameter of which decreases from a side corresponding to the one end face of the bridge fiber toward a side corresponding to the other end face of the bridge fiber.

8. The bridge fiber according to claim 2, further comprising a tapered portion, a diameter of which decreases from a side corresponding to the one end face of the bridge fiber toward a side corresponding to the other end face of the bridge fiber.

9. The bridge fiber according to claim 6, further comprising a tapered portion, a diameter of which decreases from a side corresponding to the one end face of the bridge fiber toward a side corresponding to the other end face of the bridge fiber.

10. The bridge fiber according to claim 1, wherein the layer is an outermost layer.

11. The combiner according to claim 4, wherein the layer is an outermost layer.

12. The fiber laser device according to claim 5, wherein the layer is an outermost layer.

* * * * *